(No Model.)

D. BROOKS, Jr.
Underground Telegraph.

No. 235,734. Patented Dec. 21, 1880.

Witnesses:
A. P. Grant
W. F. Kücher

Inventor:
David Brooks, Jr.
by John A. Wiedersheim
ATTORNEY.

UNITED STATES PATENT OFFICE.

DAVID BROOKS, JR., OF PHILADELPHIA, PENNSYLVANIA.

UNDERGROUND TELEGRAPH.

SPECIFICATION forming part of Letters Patent No. 235,734, dated December 21, 1880.

Application filed June 5, 1880. (No model.)

*To all whom it may concern:*

Be it known that I, DAVID BROOKS, Jr., of the city and county of Philadelphia, and State of Pennsylvania, have invented a new and useful Improvement in Underground Telegraphs, which improvement is fully set forth in the following specification and accompanying drawings, in which—

Figure 1:
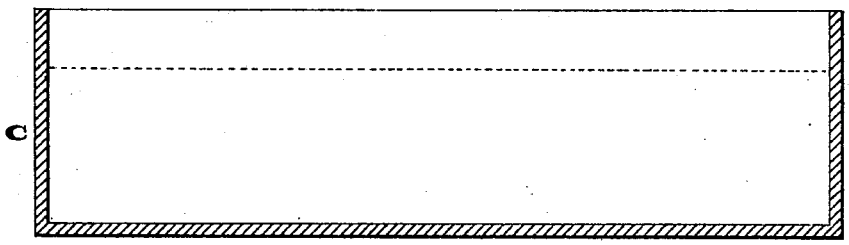
Figure 2:
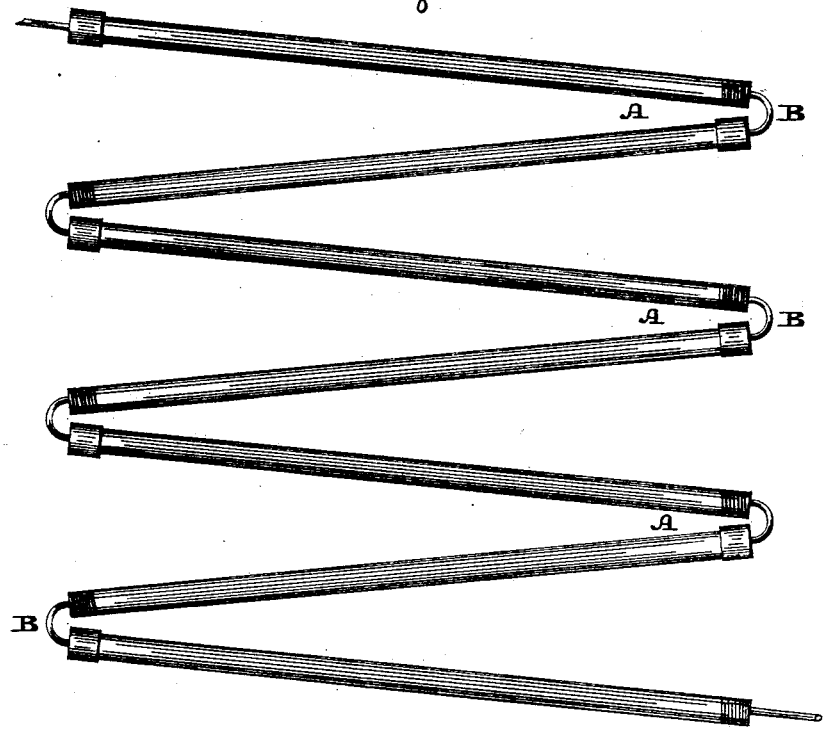

Figure 1 is a vertical section of the trough employed in my invention. Fig. 2 is a side elevation of lengths of pipe and inclosed cable embodying my invention.

My invention relates to a method of preparing telegraph wires or cable for underground purposes, whereby they may be readily transported and laid with facility and they are perfectly insulated. For this purpose I run the wires or cables into sections or lengths of pipe, and treat and manipulate the same as will be hereinafter more fully stated.

Referring to the drawings, A represents sections of metallic pipes, and B a length of wire or cable which is run into the sections A for any required distance say, one hundred yards, the sections of pipe being, say, fifteen feet long. The several sections with inclosed wire are bent over, so that the sections lie together or are folded or bundled, and the whole is placed in a tank or trough, C, and subjected therein to the action of an insulating liquid, which is properly heated, so as to expel moisture from the pipes and insulate the wires or cables.

It will be seen that by these means the telegraph may be easily and safely prepared, the insulation of the wire or cable is perfectly accomplished, the tank and contents may be readily transported, the cable immersed in the insulating liquid is prevented from exposure to air, and the telegraph may be laid directly from the tank into the ground by simply straightening out or playing the sections as needed, and screwing them together, thereby dispensing with frequent jointing and splicing of wires, and saving much expense.

Moreover, the wires or cable may be readily tested in order to find faults and crosses therein before being laid.

Having thus described my invention, what I claim as new, and desire to secure by Letters Patent, is—

The method of preparing telegraph wires or cables for underground purposes, the same consisting in inclosing a continuous length of wire in sections of connectible pipes, and placing the whole, bundled or folded, in a tank containing heated insulating liquid, whereby both the moisture of the pipes is expelled and the wires or cables are insulated, the sections being afterward straightened out and connected as needed, substantially as and for the purpose set forth.

DAVID BROOKS, JR.

Witnesses:
WILLIAM H. WAHL,
JOHN A. WIEDERSHEIM.